United States Patent
Le Breton et al.

(10) Patent No.: US 11,685,964 B2
(45) Date of Patent: Jun. 27, 2023

(54) METHOD AND SYSTEM FOR RECOVERING MAGNETIC GRAINS FROM SINTERED MAGNETS OR PLASTIC MAGNETS

(71) Applicants: CENTRE NATIONAL DE LA RECHERCHE SCIENTIFIQUE, Paris (FR); UNIVERSITE DE ROUEN NORMANDIE, Mont saint-Aignan (FR); INSTITUT NATIONAL DES SCIENCES APPLIQUEES DE ROUEN NORMANDIE, Saint-Etienne-du-Rouvray (FR)

(72) Inventors: Jean-Marie Le Breton, Saint Pierre de Manneville (FR); Nicolas Maat, Mont Saint Aignan (FR); Cyril Aymonier, Begles (FR)

(73) Assignees: CENTRE NATIONAL DE LA RECHERCHE SCIENTIFIQUE, Paris (FR); UNIVERSITE DE ROUEN NORMANDIE, Mont Saint-Aignan (FR); INSTITUT NATIONAL DES SCIENCES APPLIQUEES DE ROUEN NORMANDIE, Saint-Etienne-du-Rouvray (FR)

( * ) Notice: Subject to any disclaimer, the term of this patent is extended or adjusted under 35 U.S.C. 154(b) by 359 days.

(21) Appl. No.: 16/318,490

(22) PCT Filed: Jul. 17, 2017

(86) PCT No.: PCT/EP2017/067985
§ 371 (c)(1),
(2) Date: Jan. 17, 2019

(87) PCT Pub. No.: WO2018/015331
PCT Pub. Date: Jan. 25, 2018

(65) Prior Publication Data
US 2019/0226052 A1    Jul. 25, 2019

(30) Foreign Application Priority Data

Jul. 21, 2016   (FR) ...................................... 1656962

(51) Int. Cl.
*C22B 7/00*    (2006.01)
*C22B 59/00*   (2006.01)
(Continued)

(52) U.S. Cl.
CPC .............. *C22B 7/006* (2013.01); *B01D 11/02* (2013.01); *B01D 11/0207* (2013.01);
(Continued)

(58) Field of Classification Search
None
See application file for complete search history.

(56) References Cited

U.S. PATENT DOCUMENTS

| 6,533,837 | B1 | 3/2003 | Yamagata et al. |
| 7,166,145 | B1 * | 1/2007 | Han ...................... C22B 11/048 75/744 |

(Continued)

FOREIGN PATENT DOCUMENTS

| CN | 203875346 U | * 10/2014 |
| CN | 104668567 A | 6/2015 |

(Continued)

OTHER PUBLICATIONS

English translation of CN 203875346 U (originally published Oct. 15, 2014) from Espacenet.*

(Continued)

*Primary Examiner* — George Wyszomierski
(74) *Attorney, Agent, or Firm* — Nixon & Vanderhye

(57) ABSTRACT

Disclosed is a method and a device for retrieving, from an object A, elements G present in a matrix M, the method including at least the following steps: bringing said abject A (Continued)

Figure 1A:
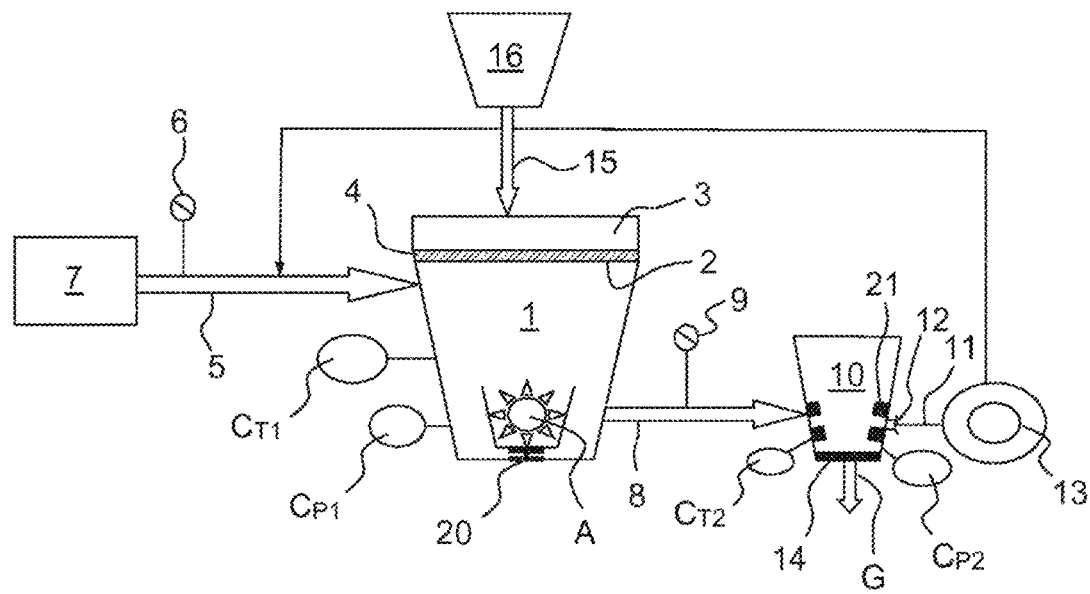

into contact with a dense fluid Fd with a molar mass greater than 2 g mol$^{-1}$ under temperature $T_1$ and pressure $P_1$ conditions suitable for transforming the intergranular phase and for releasing the elements G, modifying the temperature $T_2$ and/or pressure $P_2$ values to stop the reaction transforming the intergranular phase, and recovering the elements G separated front the matrix M.

16 Claims, 2 Drawing Sheets

(51) Int. Cl.
    *H01F 41/02*     (2006.01)
    *B01D 11/02*     (2006.01)
    *B09B 3/80*     (2022.01)
    *H01F 1/057*     (2006.01)

(52) U.S. Cl.
    CPC .......... *B01D 11/0288* (2013.01); *B09B 3/80* (2022.01); *C22B 59/00* (2013.01); *H01F 1/0577* (2013.01); *H01F 41/0253* (2013.01); *Y02P 10/20* (2015.11)

(56) References Cited

U.S. PATENT DOCUMENTS

| | | | |
|---|---|---|---|
| 8,734,714 | B2 | 5/2014 | Harris et al. |
| 2002/0153062 | A1* | 10/2002 | Hasegawa ............. B22D 13/02 |
| | | | 148/105 |
| 2006/0278517 | A1* | 12/2006 | Machida ............. H01F 41/0253 |
| | | | 204/192.1 |
| 2014/0311294 | A1 | 10/2014 | Jacobson et al. |
| 2016/0311294 | A1* | 10/2016 | Swab ................. B60H 1/00428 |
| 2018/0304325 | A1* | 10/2018 | Le Breton ............. C01F 17/206 |

FOREIGN PATENT DOCUMENTS

| | | |
|---|---|---|
| EP | 1 091 007 A1 | 4/2001 |
| EP | 2 781 623 A1 | 9/2014 |
| FR | 2 852 608 A1 | 9/2004 |
| JP | 2001-110615 A | 4/2001 |
| JP | 2009038197 A * | 2/2009 |
| JP | 2012-079947 A | 4/2012 |
| JP | 2012-132052 A | 7/2012 |
| JP | 2017-039960 A | 2/2017 |
| WO | 99/32673 A1 | 7/1999 |

OTHER PUBLICATIONS

English translation of JP 2009-038197 (originally published Feb. 19, 2009) obtained from PE2E.*
International Search Report, dated Nov. 9, 2017, from corresponding PCT/EP2017/067985 application.
FR Search Report, dated Apr. 7, 2017, from corresponding FR 1 656 962 application.

* cited by examiner

METHOD AND SYSTEM FOR RECOVERING MAGNETIC GRAINS FROM SINTERED MAGNETS OR PLASTIC MAGNETS

The invention relates to a method and a system for recovering, for example, magnetic grains in sintered magnets, plastic magnets or magnetic tapes.

It is particularly applicable for the recovery of Nd—Fe—B permanent magnets used in many industrial fields.

It also finds its application in the case of objects for which it is desired to recover elements of interest linked by a matrix that can be transformed by the implementation of the method.

In the remainder of the description, the word "object" designates an object composed of a polymer, ceramic or metallic matrix and the "grains" recovered from magnetic, ferroelectric, electrical, optical, mechanical, catalytic, etc., i.e. grains of a chemical composition of interest. The expression "chemical composition of interest" or "elements of interest" designates elements that one wishes to recover and possibly valorize. Examples will be given in the following description. A dense fluid corresponds to a fluid whose molar mass is strictly greater than $2 \cdot g \cdot mol^{-1}$.

The term matrix is associated with the grains and the phases allowing the link between the various grains. The matrix may be a polymer, ceramic or metallic matrix, for example.

The exploitation of "urban mines" that constitute waste electrical and electronic equipment (WEEE) has established itself as a privileged choice, motivated both by the consequent consumption of these elements by industrialized countries and by the preservation of the environment, which requires the best possible recycling of waste produced daily by human activities. The recycling of permanent magnets from WEEE requires the development of processes that make it possible to valorize all of the material.

Among the materials of interest in sintered magnets, plastic magnets or magnetic tapes, are magnets such as neodymium Nd—Fe—B or samarium cobalt Sm—Co magnets directly obtained from the dismantling of objects containing magnets, for example WEEE, such as hard drives, speakers, electric motors, etc.

To recycle the magnetic phase of these objects, it is known to use a hydrogen treatment followed by a high temperature annealing to desorb the hydrogen.

Hydrogen decrepitation treatment is a known method for "breaking up" rare earth alloys and magnets.

In decrepitation treatment, the hydrogen will first react with the grain boundaries, since these are mainly composed of rare earth elements and are therefore highly reactive. Subsequently, once the hydrided grain boundaries are thus weakened, the hydrogen is introduced into the magnetic grains to form hydrogenated compounds. The embrittlement of the grain boundaries and the expansion of the crystal lattice caused by the insertion of hydrogen (a volume increase of about 5% is observed in the case of the Nd—Fe—B magnets) will induce the atomization of the material. The magnetic grains are then recovered in the form of a powder, and may be used for the manufacture of new magnetic materials.

U.S. Pat. No. 6,633,837 discloses a method of recovery by dissolving bonded magnets.

U.S. Pat. No. 8,734,714 describes a method of recovering the magnetic phase using hydrogen to recover the rare earths from the magnetic elements. The use of gaseous hydrogen imposes very important safety precautions.

Other methods use strong acid baths to dissolve the magnets and extract the neodymium, which poses an economic and environmental problem. In addition, acids must be processed and used only once.

Hydrometallurgical methods use acid baths to dissolve materials, which is a strong environmental constraint.

There is therefore, at present, a need to have an industrial method that can recover magnetic elements without deterioration of their magnetic properties while preserving the environment. The method according to the invention implements a hydro/solvothermal treatment based on the transformation of the elements and not on fusion. The conditions of temperature and pressure are chosen in order to remain under the conditions inducing the fusion of an object or elements to be released.

The invention relates to a method for recovering elements G from an object A, that are present in a matrix M, characterized in that the method comprises at least the following steps:

Contacting the object A with a dense fluid Fd of molar mass greater than 2 g Mol$^{-1}$ under conditions of temperature $T_1$ and pressure $P_1$ that are designed to transform the intergranular phase or the matrix and to release the elements G, wherein the temperature conditions and pressure are strictly lower than the temperatures inducing the melting of the object A or elements G to be released, Modifying the $T_2$ temperature and/or $P_2$ pressure values to stop the transformation reaction of the intergranular phase, Retrieving the separated G elements from the matrix M.

When the object is surrounded by a protective layer, the method comprises a pretreatment step wherein the object A is brought into contact with a corrosive solution in order to weaken the protective layer.

The value of the temperature $T_2$ and/or the value of the pressure $P_2$ are chosen to maintain the integrity of the physico-chemical properties of the elements G separated from the matrix M.

To stop the reaction, the method decreases the temperature values below 100° C., and/or lowers the pressure to between 0.1 and 25 MPa in order to protect the integrity of the elements G of interest.

For transforming the grain boundaries and detaching the elements of interest from the matrix, use is made, for example, of a dense fluid Fd chosen from the following list: water, distilled water, alcohol, water/alcohol mixture, a mixture of water and sodium chloride, a mixture of water and sodium metabisulfite.

The step of contacting the object A with the dense fluid Fd allowing the reaction, is carried out in a first chamber equipped with a temperature sensor $C_{T1}$ and a pressure sensor $C_{P1}$, while the stopping step of the reaction is carried out in a second chamber equipped with pressure sensor $C_{P2}$ and temperature sensor $C_{T2}$.

The method is implemented under the following temperature and pressure conditions:

For the first chamber, a temperature between 100° C. and 400° C., in which one carries out the contact with the dense fluid, For the second chamber, in which the transformation is stopped, a temperature below 100° C. and higher than the solidification temperature of the fluid, For the second chamber, a pressure lower than 25 MPa and greater than 0.1 MPa.

G elements are recovered by sieving or using a cyclone effect.

The method is implemented for the recovery of magnetic grains in sintered magnets or plastic magnets.

The object A is, for example, composed of Nd—Fe—B magnet, wherein $Nd_2Fe_{14}B$ crystallites and a small amount of neodymium hydroxide $Nd(OH)_3$ are separated.

The method comprises a pretreatment step of contacting the Nd—Fe—B magnet with a solution composed of distilled water and NaCl at room temperature.

The invention also relates to a device for recovering elements G from an object A, that are present in a matrix M, characterized in that it comprises at least the following elements:
- A first chamber containing the object A and comprising a duct for introducing a dense fluid Fd of molar mass greater than 2 g mol$^{-1}$, a temperature control and temperature control module $C_{T1}$, $C_{T2}$ and pressure $C_{P1}$, $C_{P2}$ to perform the steps of the method according to the invention,
- A module for recovering G elements separated from the matrix, in particular from the intergranular phase.

According to one variant, the device comprises at least a first chamber containing the object A to be treated, sealing means, a first duct for introducing a dense fluid Fd, a duct for discharging a mixture containing the dense fluid Fd used for the transformation of the matrix M and the G elements released, wherein the discharge duct is in connection with a second chamber comprising a discharge duct provided with a grid or a screen preventing the passage of released grains in order to recover the dense fluid used for the reaction, a dense fluid recycling circuit to the first chamber, wherein the second chamber is equipped with control means that are designed to stop the reaction and preserve the physicochemical properties of the grains released.

According to another variant, the device comprises at least a first chamber containing the object A to be treated, sealing means, a first duct for introducing a dense fluid, a duct for discharging a mixture containing the dense fluid Fd used for the transformation of the matrix M and the separated elements G, wherein the mixture is introduced into a cyclone device equipped with temperature control means that are designed to stop the reaction and preserve the physicochemical properties of the grains released.

Figure 1B:
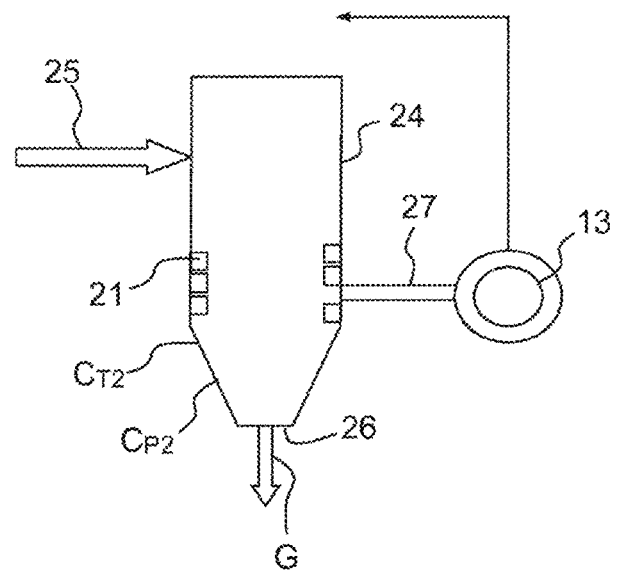
Figure 2:
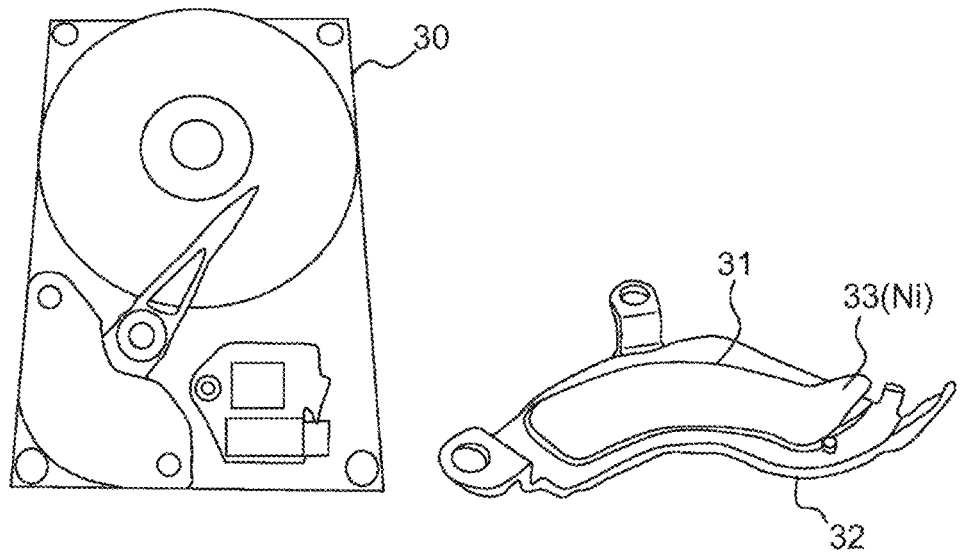
Figure 3:
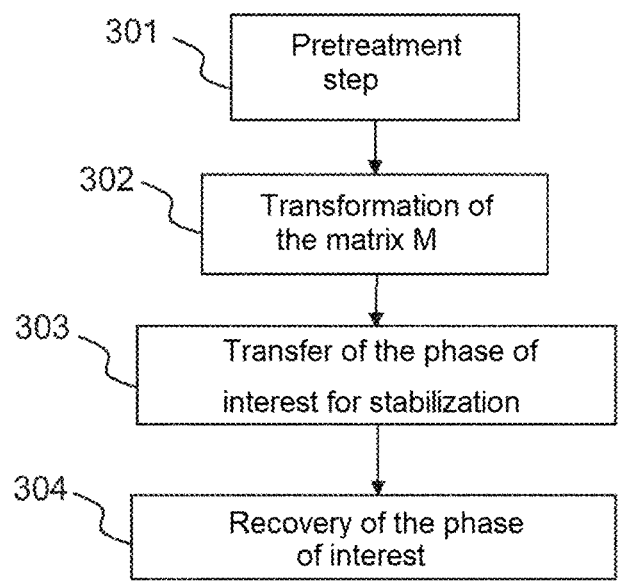

Other features and advantages of the present invention will become apparent upon reading the following description related to the figures, wherein:

FIG. 1A shows a schematic device for implementing the method according to the invention, FIG. 1B shows an alternative embodiment, FIG. 2 shows an example of an object, and FIG. 3 shows a diagram illustrating the sequence of steps of the method.

In order to clearly understand the method according to the invention, the following example is given by way of non-limiting illustration for recovering a magnetic phase (neodymium-iron-boron), Nd—Fe—B, within an object A in which this Nd—Fe—B magnetic phase is sintered or bound by a matrix M. The neodymium-iron-boron alloy consists of $Nd_2Fe_{14}B$ grains, having a size of between 1 and 20 µm. These are the grains that give magnetic properties to the material. Between these grains is an intergranular phase, composed mainly of neodymium and which, for this reason, is called "Nd-rich" in the literature. This intergranular phase magnetically disconnects the grains, providing the material with high coercivity, i.e. demagnetization resistance. By extension, any magnetic material coated with a matrix may be treated with the method. The method may be applied to any element or grain of interest that one wishes to recover and valorize and which is dispersed in a matrix, wherein this matrix may be an alloy, a ceramic or a polymer.

FIG. 1A schematizes an autoclave chamber, for example, in which an object to be treated is positioned, for example an Nd—Fe—B magnet directly resulting from the dismantling of the WEEE. The chamber 1 comprises an opening 2 for the introduction of the object "A" to be treated, and a cover 3 equipped, for example, with a seal 4 to ensure a tight seal. A first introduction duct 5 equipped, for example, with a valve 6 makes it possible to inject a dense fluid Fd such as a solvent stored in a reservoir 7. The fluid or dense fluid, as defined previously, has the particularity of causing the transformation of the intergranular phase thus making it possible to release $Nd_2Fe_{14}B$ grains, in this example, while preserving the magnetic properties of the grains, under selected operating conditions of temperature and pressure. The fact of not using hydrogen in normal operation of the process advantageously makes it possible to overcome safety concerns.

The chamber may also contain a continuous introduction duct 15 for the object to be treated and stored, for example, in a container 16.

For example, the object A to be treated is a Neodymium-Iron-Boron sintered permanent magnet consisting of:
- an intergranular phase, mainly composed of neodymium and which, for this reason, is called "Nd-rich" in the literature, and $Nd_2Fe_{14}B$ grains having a size between 1 and 20 µm, which give the magnetic properties to the material.

Object A may also be a composite plastic magnet with:
- an intergranular matrix or phase made of polymer, and
- magnetic grains of various compositions according to the applications of the plastic magnet.

In the case of ceramic objects, the matrix will be an inorganic phase.

The mixture, containing the fluid used for the transformation and the $Nd_2Fe_{14}B$ grains, is discharged through a discharge duct 8 equipped with a valve 9 and which opens, for example, into a second chamber 10. This second chamber 10 comprises a discharge duct 11 provided with a screen or sieve 12 comprising orifices of selected dimensions to prevent the passage of $Nd_2Fe_{14}B$ grains in order to mainly recover the fluid used for the reaction. The fluid is then recycled through the duct 11 and with the aid of a pump 13, for example to the introduction duct 5 of the main chamber 1. The grains $Nd_2Fe_{14}B$ are retained in the second chamber 10. The grains $Nd_2Fe_{14}B$ may be evacuated by means of a hatch 14 located at the bottom of the chamber. The storage conditions (temperature and/or pressure) in the second chamber 10 are so chosen that the magnetic grains separated from the matrix do not deteriorate, do not oxidize, and retain their magnetic properties.

Another solution for recovering the separated grains consists, in particular, in using a cyclone type device 24 for the second chamber, as shown in FIG. 1B. The mixture containing the $Nd_2Fe_{14}B$ grains and the fluid is introduced into the cyclone composed of a body and a conical section by means of a duct 25. The cyclone-type device is equipped with cooling means 21 and temperature and pressure sensors $C_{T2}$, $C_{P2}$, as shown in FIG. 1B. $Nd_2Fe_{14}B$ grains are separated from the dense fluid and recovered via a discharge duct 26. The fluid is discharged through a duct 27 connected, for example, to a recirculation circuit similar to that of FIG. 1A.

The chamber 1, or main chamber, in which the transformation takes place, is also equipped with a heating means 20 in order to reach the temperature necessary to start the transformation of the matrix or the intergranular phase to release the grains. The heating means 20 are, for example, in the form of a heating resistor or any other suitable heating device. The chamber 1 is, for example, equipped with a temperature sensor $C_{T1}$ and a pressure sensor $C_{P1}$ to monitor the temperature and the pressure in the main chamber 1 in which the reaction takes place.

The second chamber 10 is equipped with temperature sensor $C_{T2}$ and pressure sensor $C_{P2}$ and cooling means 12 to stop the reaction and stabilize the composition of the magnetic phase of $Nd_2Fe_{14}B$ grains in the case of Nd—Fe—B magnet treatment.

FIG. 2 shows a computer hard disk 30 comprising an Nd—Fe—B magnet 31, covered with nickel, 33, mounted on a support 32 which may be the object from which the magnet is to be recovered.

FIG. 3 illustrates the steps implemented for the recovery of the magnetic phase by means, for example, of the device shown in FIG. 1.

The first step, 301, is optional and consists in immersing into a corrosive solution, for example an NaCl sodium chloride solution for a nickel layer, the object A in order to weaken a possible protective layer, wherein this protective layer will be partially attacked, which causes its embrittlement during the reaction in the first chamber 1 and its fragmentation. In the case of a polymer matrix, it will also be depolymerized and solubilized during the treatment in the first chamber 1.

During a second step, 302, the object A is immersed or brought into contact with a dense fluid that is chosen to cause the transformation of the matrix, intergranular phase or organic matrix which encompasses the phase of interest, in order to release the magnetic grains. The chamber 1 is heated and pressurized to a desired temperature $T_1$ and pressure $P_1$. The conditions of temperature and pressure will be chosen in order to be strictly below the temperatures inducing the melting of the object A or magnetic grains to be released, for example at 250° C. and 25 MPa in order to trigger the reaction. In fact, there is no melting of the released grains. The dense fluid Fd will cause the degradation of the intergranular phases of the materials which leads to the atomization of the solid magnets following the loosening of the crystallographic grains. In the case of plastic magnets, the rise in temperature and pressure will cause the depolymerization of the matrix, and the organic species will be entrained with the fluid. The powder thus obtained is removed from the reaction medium as soon as possible in order to preserve the magnetic properties of the grains.

For this, the method in a third step, 303, decreases the value of the temperature in order to stop the transformation, which corresponds to a transfer of the phase of interest to a region of the installation where the conditions of temperature and pressure allow the preservation of the integrity of the elements obtained. In this step, the material that has already reacted is set aside, while the reaction is able to continue in the case of a continuously-fed process. In this second chamber, the temperature $T_2$ is lowered by means of the cooling means and maintained at a value of less than 100° C., while the pressure $P_2$ is between 0.1 MPa and 25 Mpa in order to stop the transformation reaction of the intergranular phase. At the end of the process, the recovered powder is thus composed of metal film residues of a millimeter dimension and a magnetic powder $Nd_2Fe_{14}B$ of micrometric size. The metal film residues may therefore be removed by simple sieving. In the case of a polymer matrix dissolved in the fluid, the magnetic grains will be retained during filtration in order to remove organic species from the medium. This protective layer is recovered and may be integrated directly into a conventional metal recycling circuit known to those skilled in the art. From an environmental point of view, this is an additional advantage.

During a fourth step, 304, carried out in the second chamber, for example, the grains are extracted from the fluid, by filtration, by magnetic separation, by the "cyclone" effect, or by any method known to those skilled in the art and adapted to the method.

The powder thus obtained can serve as a raw material for the manufacture of new magnetic materials. The magnetic properties of the final magnet will depend on the processing conditions, but also on subsequent manufacturing techniques, sintering, dispersion in a polymer matrix, etc.

The two phases (matrix and magnetic grains) may be separated by simple filtration as previously described or by magnetic separation. it allows valorization of these two phases in the most appropriate way. For example, in the case of Nd—Fe—B magnets, the "Nd-rich" matrix is recovered in the form of $Nd(OH)_3$ hydroxides. The $Nd_2Fe_{14}B$ fraction may then be recovered as a magnetic raw material while the $Nd(OH)_3$ fraction may be resold.

After sieving, the powder is mainly composed of $Nd_2Fe_{14}B$ crystallites with a mean size of 10 µm, as well as a small amount of neodymium hydroxide $Nd(OH)_3$.

The fluid used for the conversion may be extracted for recycling by a suitable circuit in the circuit to the main reactor.

The fluid or solvent used for the reaction is, for example, water, or distilled water, which has the advantage of being easy to use and inexpensive. Other solvents such as alcohols or water/alcohol mixtures may be used. The reagents that may be added will be, for example, from the family of corrosive agents conventionally used in industry. These reagents should facilitate the degradation of the matrix but not adversely affect the integrity of the grains of interest. By way of example, it is possible to cite NaCl sodium chloride, sodium metabisulphite used in a much smaller amount but having an impact on the reaction time.

For example, it is possible to use a mixture in the following proportions: 100 ml of water for 1 g of NaCl and 0.1 g of $Na_2S_2O_5$. Other corrosive salts may be used.

The first step of pretreatment of the objects A consists, for example, in bringing the Nd—Fe—B magnet into contact with a composite solution comprising a mixture of distilled water, 100 ml, and NaCl, 0.1 g for two hours at room temperature. This step makes it possible, in particular, to work subsequently in the absence of reagents, to reduce the reaction time and to protect the installations. The method will perform the first step 301 before performing the magnetic seed separation steps.

Neodymium-Iron-Boron permanent magnets, which are very sensitive to oxidation, are generally covered with one or more metallic films in order to limit their exposure to the open air when they are used in equipment. They may also consist of grains embedded in an elastomer and will then be composed of, for example, an Nd—Fe—B alloy powder in a polymer matrix; wherein they are then called bound magnets or plastic magnets. The method will perform the first step 301 before performing the magnetic grain separation steps.

The operating conditions of temperature and pressure for the reaction step are chosen, in particular, as a function of the fluid used, so that the latter is not degraded. For example, the temperature may be between 100° C. and 400° C. in the case of water.

The value of the temperature at the end of the reaction is chosen in order to stop the physicochemical process and preserve the magnetic properties of the grains recovered, wherein this value will be less than 100° C., but greater than the solidification temperature of the fluid. The pressure value may vary between atmospheric pressure Patm and 25 MPa. Depending on the technology used to carry out the separation and storage of the grains in the second chamber, the pressure $P_2$ may be equal to that of the first chamber in the case of sieving (for example, 25 MPa) or between 0.1 and 25 MPa in the case of the use of a cyclone solution, for example.

Without departing from the scope of the invention, the steps described above and carried out in two separate chambers could be performed within a single chamber provided with temperature and pressure sensors, and means for regulating the temperature and pressure that are adapted to meet all the operating conditions for the method steps. The single chamber in this case will also be equipped with separate grain recovery means and fluid for the reaction, which may be recycled by a recycling circuit.

The method steps described above also apply for other families of materials where the element to be recovered is dispersed in a matrix and where the fluid used allows the transformation of the intergranular phase under selected operating conditions.

The method according to the invention makes it possible, after dismantling the magnets contained in the WEEE, to atomize the alloy in the form of a powder, while minimizing the degradation of the material and the environmental impact. This powder may be used for the production of new magnetic materials. The method is simple in its implementation and easily used on an industrial scale. The procedure has a low impact on the environment, as the same reaction bath may theoretically be reused to recycle new magnets. The reaction occurs in a closed environment, there is no evaporation in the atmosphere.

The invention claimed is:

1. Method for recovering magnetic grains from an object A, the object A comprising said magnetic grains and an intergranular phase between the magnetic grains, wherein the object A is a sintered magnet, said method comprising at least the following steps:
   Contacting the object A with a dense fluid Fd of molar mass greater than 2 g mol$^{-1}$ under conditions of temperature $T_1$ and pressure $P_1$ that are intended to transform the intergranular phase and to release the magnetic grains, (302), wherein the temperature and pressure conditions are less than the temperatures inducing the melting of the object A or any of the magnetic grains to be released, in order to perform a transformation of the intergranular phase,
   Modifying the temperature up to a $T_2$ temperature value and/or the pressure up to a $P_2$ pressure value to stop the transformation of the intergranular phase, (303),
   Retrieving the magnetic grains separated from the intergranular phase, said magnetic grains retaining their magnetic properties sufficient to be used for the production of new magnetic materials (304).

2. Method according to claim 1 wherein the object A is surrounded by a protective layer, further comprising a pretreatment step (301) where the object is brought into contact with a corrosive solution in order to weaken the protective layer.

3. Method according to claim 2, wherein the value of the temperature $T_2$ and/or the pressure $P_2$ is chosen to protect the magnetic properties of the magnetic grains released from the intergranular phase.

4. Method according to claim 2, wherein the modifying step comprises decreasing the temperature to a value below 100° C., and/or lowering the pressure to a value between 0.1 and 25 MPa to retain the magnetic properties of the magnetic grains.

5. Method according to claim 2, wherein the dense fluid Fd is selected from the group consisting of water, distilled water, alcohol, mixture water/alcohol, a mixture of water and sodium chloride, a mixture of water and sodium metabisulphite.

6. Method according to claim 1, wherein the value of the temperature $T_2$ and/or the pressure $P_2$ is chosen to protect the magnetic properties of the magnetic grains released from the intergranular phase.

7. Method according to claim 6, wherein the modifying step comprises decreasing the temperature to a value below 100° C., and/or lowering the pressure to a value between 0.1 and 25 MPa to retain the magnetic properties of the magnetic grains.

8. Method according to claim 6, wherein the dense fluid Fd is selected from the group consisting of water, distilled water, alcohol, mixture water/alcohol, a mixture of water and sodium chloride, a mixture of water and sodium metabisulphite.

9. Method according to claim 1, wherein the modifying step comprises decreasing the temperature to a value below 100° C., and/or lowering the pressure to a value between 0.1 and 25 MPa to retain the magnetic properties of the magnetic grains.

10. Method according to claim 1, wherein the dense fluid Fd is selected from the group consisting of water, distilled water, alcohol, mixture water/alcohol, a mixture of water and sodium chloride, a mixture of water and sodium metabisulphite.

11. Method according to claim 1, wherein the step (302) of contacting the object A with the dense fluid Fd is performed in a first chamber (1) equipped with a temperature sensor $C_{T1}$ and a pressure sensor $C_{P1}$, while the modifying step (303) is performed in a second chamber (10) equipped with pressure sensors $C_{P2}$ and temperature $C_{T2}$.

12. Method according to claim 11 which operates under the following conditions of temperature and pressure:
   For the first chamber, a temperature between 100° C. and 400° C.,
   For the second chamber, a temperature below 100° C. and above the solidification temperature of the fluid,
   For the second chamber, a pressure lower than 25 MPa and greater than 0.1 MPa.

13. Method according to claim 1 wherein the retrieving step comprises recovering the magnetic grains by sieving.

14. Method according to claim 1 wherein the retrieving step comprises recovering the magnetic grains by a cyclone effect.

15. Method according to claim 1 wherein the object A is composed of Nd—Fe—B magnet and wherein the magnetic grains to be recovered are $Nd_2Fe_{14}B$ crystallites.

16. Method according to claim 15 further comprising a pretreatment step bringing into contact the Nd—Fe—B magnet with a solution composed of distilled water and NaCl at room temperature.

* * * * *